Jan. 29, 1963     R. M. SMITH     3,076,140

TRANSISTOR TEST SET

Filed Aug. 27, 1959     2 Sheets-Sheet 1

INVENTOR
Robert M. Smith
BY
HERZIG & JESSUP
Edward C. Walsh
ATTORNEYS

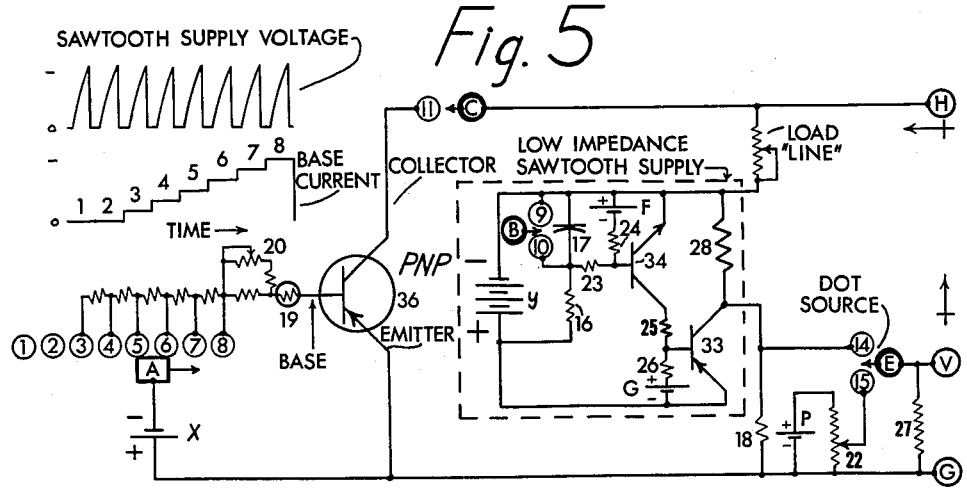

United States Patent Office 3,076,140
Patented Jan. 29, 1963

3,076,140
TRANSISTOR TEST SET
Robert M. Smith, 602 14th St., Santa Monica, Calif.
Filed Aug. 27, 1959, Ser. No. 836,452
8 Claims. (Cl. 324—158)

This invention relates to an improved, simplified and inexpensive apparatus or test set for measuring and visibly displaying the characteristics of transistors, particularly the collector current/voltage characteristics. The invention is adapted for testing and displaying the characteristics of both n-p-n or p-n-p type transistors and also vacuum tubes.

In an exemplary form of the invention for displaying the collector current/voltage characteristic of n-p-n type transistors, the characteristic is displayed on an oscilloscope. A sawtooth voltage is generated and applied to the collector load resistor of the transistor. The horizontal input terminal of the oscilloscope is connected to the collector to sweep the electron beam in accordance with the collector sawtooth voltage. A stepped current is applied or fed to the base of the transistor synchronously with the generation of the sawtooth voltage, the vertical input terminal of the scope being connected across a resistor through which the collector current passes so that the scope displays a pattern of the collector current characteristics of the transistor at various base currents.

The test set is of a novel, simplified and inexpensive form providing for accurate measurement and display of the said characteristics. The result is achieved by ganged motor driven mechanical switches operating as a unit to effect the generation of the sawtooth voltage supply and to produce the stepped current input for the base of the transistor. The ganged switches are of simple and inexpensive commercial type comprising rotary contactor members on a motor driven shaft arranged to bridge and unbridge circumferentially arranged contacts or contactors. The device includes an additional rotary contactor which opens once during each revolution in the sequence to interrupt the collector circuit so that the collector current is zero to establish the base line of the pattern on the oscilloscope.

The invention embraces the further novel feature of an additional rotary contactor and circuitry for establishing a reference dot on the oscilloscope screen representing a known current value for quick reading of the current values represented by the pattern on the screen. The contactor for this function operates in sequence with the other rotary contactors.

The invention embraces further embodiments wherein the circuitry is varied for testing and displaying the characteristics of n-p-n type transistors and also of vacuum tubes. The invention further embraces variations in the circuitry adapted to provide a low impedance sawtooth voltage supply adapted for the testing and displaying the characteristics of a power transistor.

The invention further embraces additional improvements in the circuitry for producing the reference dot on the scope so that the dot is accurately positioned without horizontal displacement thereof.

In accordance with the foregoing, a primary object of the invention is to provide an improved, practical, simplified and inexpensive tester or apparatus adapted for displaying the collector current/voltage characteristics of various types of transistors or the analogous characteristics of vacuum tubes.

Another object is to provide a tester as in the foregoing wherein the characteristics are displayed on an oscilloscope and integrated circuitry for displaying a dot on the oscilloscope representative of a predetermined know current to facilitate interpreting the current values represented by the characteristic pattern displayed on the oscilloscope.

Another object is to provide an apparatus or tester as in the foregoing wherein rotary ganged mechanical switches are provided operating in sequence to apply a sawtooth voltage to the collector or emitter of a transistor and to feed a varying stepped current function to the base of the transistor, the collector sawtooth voltage being connected to the horizontal input terminal of an oscilloscope and the vertical input terminal being connected to respond proportionally to the collector or emitter current.

A further object is to provide an apparatus as in the foregoing object including an additional rotary mechanical contact arranged to interrupt the collector or emitter circuit once on each revolution to establish a zero base line in the pattern on the oscilloscope.

A further object of the invention is to provide improved circuitry in a tester as in the foregoing employing a low impedance sawtooth voltage supply adapted for the testing of power transistors.

Another object is to provide additional improved circuitry for providing the dot displayed on the oscilloscope and including an additional rotary contactor adapted to disconnect the vertical input terminal of the oscilloscope once during each cycle and to connect a source of voltage supply for the dot display on the oscilloscope.

Further objects and additional advantages of the invention will become apparent from the following detailed description and annexed drawings, wherein:

FIG. 5 is a circuit diagram of a modified form of the invention adapted for testing power transistors and having modified circuitry for producing the dot displayed on the oscilloscope;

FIG. 6 is a circuit diagram of a further modified form of the invention adapted for testing vacuum tubes;

FIG. 7 is a detail view of the additional rotary contactor used in FIG. 5 and FIG. 6; and FIG. 8 is a diagrammatic view of the pattern displayed on the oscilloscope in the form of the invention shown in FIG. 5.

Figure 1:
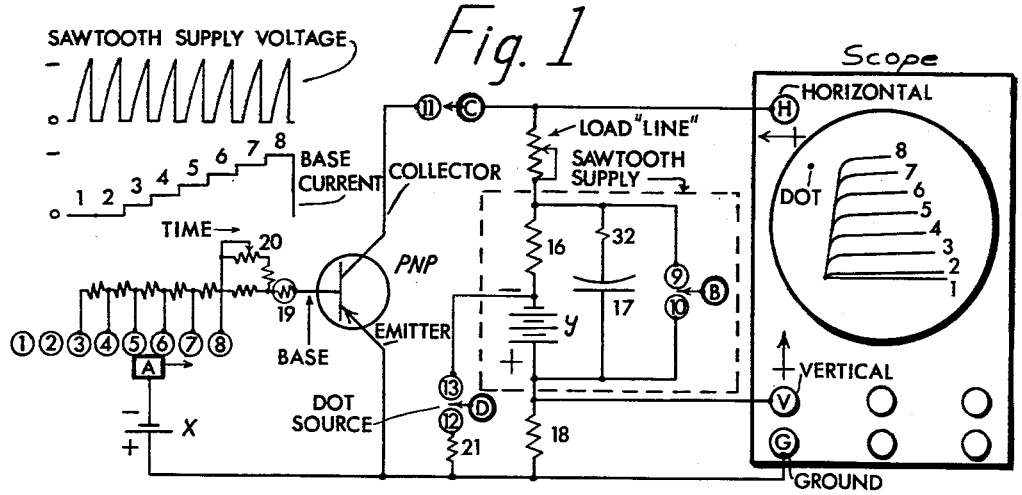
FIG. 1 is a circuit diagram of a preferred form of the invention.

Referring now more in detail to FIG. 1 of the drawings, the various components of the circuitry are identified by legends and characters. The collector current/voltage characteristics are displayed on the scope as diagrammatically shown and indicated by the numbers. The oscilloscope operates simply as a voltmeter. Horizontal deflection on the scope represents voltage applied to the horizontal input terminal marked H and the vertical deflection on the scope is directly proportional to the collector current in the circuitry of FIG. 1 as will be described.

A sawtooth voltage supply, as shown diagrammatically in FIG. 1, is applied to the collector load resistor of the transistor. A stepped current or current function as applied to the base of the transistor is also illustrated diagrammatically in FIG. 1. The collector sawtooth voltage is connected to the horizontal input terminal of the scope and sweeps the electron beam horizontally.

The sawtooth supply voltage is generated by operation of rotary mechanical contactor B and the stepped current or current function is produced by the rotary mechanical contactor A. Character C designates a further rotary mechanical contactor which once during each cycle interrupts the collector circuit to make the collector current zero establishing the base line 1 on the scope.

An additional rotary mechanical contactor D is provided operating once during each cycle to produce the current reference dot as shown on the oscilloscope screen in FIG. 1.

The sawtooth voltage supply comprises the battery y connected across capacitor 17 through resistor 16. Resistor 32 is quite small and its purpose is to minimize reverse voltage transients when contactor B shorts contacts 9 and 10. When contactor B shorts or connects contacts 9 and 10, the collector voltage is reduced to zero. When contactor B open circuits, contacts 9 and 10, the capacitor 17 is charged through resistor 16 and thus forms the sawtooth voltage having the waveform shown. The supply voltage is applied to the collector through the load "line" potentiometer, the adjustment of which determines the sloping of the characteristic curves on the screen of the scope. The collector current flows through the resistor 18. Resistor 18 may have a resistance, for example, such that when ten milliamperes flows through it, a voltage of one half volt appears across it; the vertical deflection of the beam of the scope then represents a ten milliampere current.

The generation of the sawtooth voltage as stated is mechanically synchronized with the current stepping function fed to the base of the transistor by the mechanically ganged contactor A. Contactor A cooperates with a group of circumferentially arranged contacts numbered 1 to 8 as shown in FIG. 1 which connect to the terminals between a group of similar resistances as shown. As the contactor A rotates bridging adjacent contactors, the resistance in the circuit through battery X is varied in steps to produce a current function as shown diagrammatically in FIG. 1. Numeral 19 designates a current meter and potentiometer 20 provides an adjustment to compensate for the base resistance of the transistor such that the contactor A will generate a uniform current stepping function. If battery X is of large enough value, the base resistance of the transistor can be ignored since this would then be essentially a current generator.

Line 2 on the scope is produced by the leakage current of the transistor and of course the sawtooth horizontal sweep. The lines numbered 3 to 8 are produced by the different base currents injected into the transistor.

The reference dot which is a display of a fixed current value is generated by way of the rotary contactor D in FIG. 1. Contactor D bridges contacts 12 and 13 once during each cycle, these contacts connecting directly across battery y and resistor 18 through resistor 21. Resistance 21 is of a value such that when terminals 13 and 12 are connected by contactor D, ten milliamperes passes through resistance 21 and resistance 18 and a ten milliampere dot appears on the face of the scope.

Figure 4:
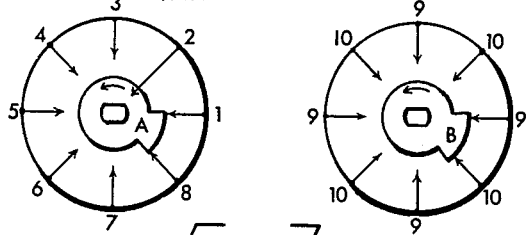
FIG. 4 is a perspective view of a motor driven ganged mechanical switch having four rotors and cooperating contactor members.
Figure 4:
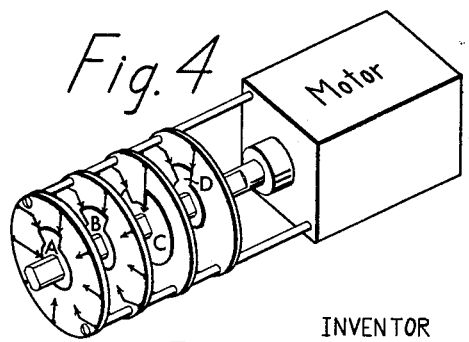
Figure 3:
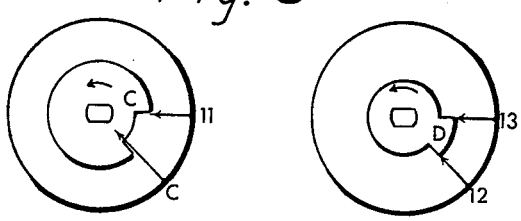
FIG. 3 is a view of the rotary contactors of the ganged rotary switch of FIG. 4.

As previously stated, the contactors A, B, C, and D are ganged rotary mechanical contactors as illustrated diagrammatically in FIGS. 3 and 4. As illustrated in these figures, these contactors are on the shaft of a motor as shown in perspective in FIG. 4 and they cooperate with circumferentially arranged contacts as may be seen in FIG. 3. Contactor A cooperates with contacts 1 to 8 as shown; contactor B cooperates with contacts 9 and 10. Contactor C opens circuits the connection to contact 11 once during each revolution, i.e., once during each cycle and contactor D bridges contacts 12 and 13 once during each cycle at the time contact 11 opens and contacts 9 and 10 are bridged by contactor B. As may be seen as the contactor A rotates, contactor B operates in synchronism, synchronizing the operation of the sawtooth wave generator with the application of the stepped current function to the base of the transistor. At the beginning of each cycle, the dot is formed on the screen of the scope and the base line 1 is produced by the opening of contact C. As may be observed therefore, the apparatus or test set is of practical, simplified and inexpensive nature but being very positive, accurate and effective in operation and in the display of the desired characteristic. The utility and convenience of the set in its usage are augmented by the display of the reference dot visibly indicating a predetermined known reference current. The equipment required can be assembled in a compact set realizing a device which is extremely dependable, reliable and easy to operate and interpret.

Figure 2:
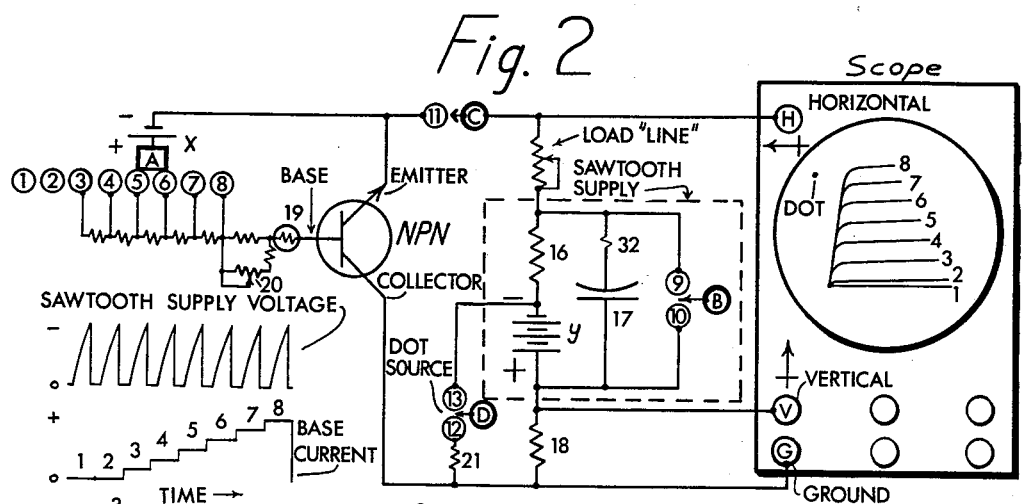
FIG. 2 is a circuit diagram like that of FIG. 1 adapted for testing n-p-n transistors.

Referring to FIG. 2 of the drawings, the foregoing description is applicable except to the extent that the circuitry is modified to adapt the tester for displaying the characteristics of an n-p-n type transistor. In the circuitry of FIG. 2, the sawtooth voltage supply is applied to the emitter electrode of the transistor through the load "line" resistor. The stepped current or current function applied to the base of the transistor is the same as in FIG. 1 being connected between the base and the emitter. However, in FIG. 2 the opposite polarity of battery X is applied to the base.

The display resulting from the circuitry of FIG. 2 is the same as that shown in FIG. 1.

FIG. 5 shows a modified form of the circuitry adapted for testing power transistors. In the circuitry of FIG. 5, the sawtooth voltage generated by contactor B injects a sawtooth current into the base of transistor 34 which acts as an amplifier and injects a larger sawtooth current into the base of power transistor 33 which in turn generates a sawtooth voltage across resistor 28 having a waveform as shown diagrammatically in the figure. Resistor 28 is low in value and thus furnishes a low impedance sawtooth voltage for the p-n-p transistor under test. Battery G in series with the resistor 26 minimizes leakage current in transistor 33 and insures a sharp cutoff of the transistor. Battery F in series with resistor 24 minimizes leakage current in transistor 34. Resistor 23 is for limiting the sawtooth current in the base of the transistor 34. Resistor 25 is for limiting the sawtooth current in the base of the transistor 33.

FIG. 5 also shows slightly modified circuitry for producing the dot function, that is, the current reference indicated by the said dot. The reference dot can be more accurately set by the circuitry of FIG. 5. An additional rotary mechanical contractor E is provided which is shown in detail in FIG. 7. This contactor is on the shaft of the motor of FIG. 4 for this modification of the invention. Contactor E cooperates with the contacts 14 and 15 in the manner illustrated in FIG. 7. Contact 14 is normally connected to contactor E as may be seen in FIG. 7. Once during each revolution, that is each cycle, contact 15 is connected to contactor E by the extending finger as shown in FIG. 7 and at this point, contact 14 is disconnected by reason of the narrow gap or notch in the contactor E as seen in FIG. 7. Battery P in series with potentiometer 22 generates a voltage between terminal 15 and ground of the scope. This is adjusted to the voltage that resistor 18 has been calibrated for. For example, if resistance 18 has been calibrated such that when ten milliamperes passes through it, a voltage of one half volt appears across it. Therefore, potentiometer 22 is set for one half volt and a ten milliampere dot appears on the face of the scope. The dot voltage or reference can be more accurately set by this circuitry. The reference dot is not displaced to the left as it is in FIGS. 1 and 2. The advantage of this type of reference dot formation is that it can be calibrated more accurately on a separate voltage source.

Resistance 27 in FIG. 5 is to prevent the scope from picking up stray signals by presenting it to a lower impedance and yet not sufficiently low as to effect the accuracy of resistance 18. Therefore, resistance 27 is quite large in comparison to resistance 18.

FIG. 6 shows a form of the invention similar to that of FIG. 5 but adapted for testing and displaying the characteristics of a vacuum tube. This figure shows a five element or pentode tube under test having a screen and suppressor as shown. The generation of the sawtooth voltage is slightly different in FIG. 6. In this modification, the capacitor 17 is allowed to discharge through resistor 16 to produce a sawtooth grid voltage for vacuum tube 35. This sawtooth grid voltage creates a high voltage sawtooth waveform across resistor 29 supplied by battery K.

The contactor A in this modification applies a stepped grid voltage to the vacuum tube, that is a voltage between the grid and cathode as indicated diagrammatically on the figure. The screen has a voltage on it applied from the battery S and controlled by potentiometer 30.

The operation of the circuitry of FIG. 6 is similar to and corresponds to that of the other figures except for the modifications as just described.

FIG. 8 is a representation of the output waveforms or characteristics resulting from the circuitry of FIG. 6. The lines 2 to 8 represent grid voltages of the pentode type tube being tested. Line 1 is of course a voltage reference line caused by the open circuiting of the plate by contactor C of FIG. 6. The pattern of FIG. 8 may of course be interpreted or read as the pattern resulting from testing of a transistor as in the other figures.

From the foregoing, those skilled in the art will observe that the invention achieves the objectives stated in the foregoing. By the principles of the invention, there is realized an extremely simple, practical, and inexpensive but yet positive, accurate and effective test set or apparatus for measuring and displaying the characteristics as stated of different types of transistors and/or vacuum tubes. The arrangement is particularly novel and possessed of high utility by reason of the additional feature whereby a reference dot is displayed on the scope to provide a quick illustration or reading of a known predetermined reference current.

The foregoing disclosure is representative of preferred forms of the invention and is to be interpreted in an illustrative rather than a limiting sense, the invention to be accorded the full scope of the claims appended hereto.

What is claimed is:

1. In a test set for measuring and displaying the characteristics of a device such as a transistor or vacuum tube having at least three elements, in combination, means for applying a sawtooth voltage to one of the elements and applying said elements voltage to the horizontal input of an oscilloscope, means for applying a stepped current function to a control element of the device and means for synchronizing the application of the said voltage and stepped current function, said means comprising a ganged rotary mechanical switch having ganged synchronously operated rotary contactors controlling the application of said voltage and said current function and means for applying a voltage proportional to the current flow through said first element to the vertical input of the oscilloscope and means within said test set providing sources for said sawtooth voltage and stepped current function.

2. The tester of claim 1 including an additional rotary ganged mechanical contactor arranged to interrupt the circuit of said first element once during each rotary cycle of the ganged switches to establish a zero base line on the pattern of said scope.

3. The tester of claim 1 wherein the said device is a transistor having the sawtooth voltage applied to the collector thereof, and the stepping current function applied to the base thereof.

4. The tester of claim 1 wherein the device is a transistor having the sawtooth voltage applied to the emitter thereof and the stepping current function applied to the base thereof.

5. The tester of claim 1 wherein the device is a transistor having the sawtooth voltage applied to the collector thereof, the sawtooth generator comprising means for generating a sawtooth current, transistor amplifier means for amplifying said sawtooth current, and relatively low resistance load means connected to said transistor amplifier means whereby a low impedance sawtooth voltage is provided for application to said collector.

6. The tester of claim 1 wherein said device is a vacuum tube, said sawtooth voltage generator comprising a vacuum tube amplifier, a load resistor connected to said amplifier and a source of potential in the load circuit of said vacuum tube amplifier whereby to provide a high voltage sawtooth supply connected to the plate of the said tube being tested.

7. In a test set for measuring and displaying the characteristics of a device such as a transistor or vacuum tube having at least three elements, in combination, means for applying a sawtooth voltage to one of the elements and applying said element's voltage to the horizontal input of an oscilloscope, means for applying a stepped current function to a control element of the device and means for synchronizing the application of the said voltage and stepped current function, said means comprising a ganged rotary mechanical switch having ganged synchronously operated contacts controlling the application of said voltage and said current function and means for applying a voltage proportional to the current flow through said first element to the vertical input of the oscilloscope, an additional rotary ganged mechanical contactor arranged to interrupt the circuit of said first element once during each rotary cycle of the ganged switches to establish a zero base line on the pattern of said scope, and an additional rotary ganged mechanical contactor synchronously operated to apply a predetermined voltage to the vertical input of the scope once during each rotary cycle of operation whereby a reference dot appears on the scope indicating a known predetermined current value.

8. In a test set for measuring and displaying the characteristics of a device such as a transistor or vacuum tube having at least three elements, in combination, means for applying a sawtooth voltage to one of the elements and applying said element's voltage to the horizontal input of an oscilloscope, means for applying a stepped current function to a control element of the device, and means for synchronizing the application of the said voltage and stepped current function, said means comprising a ganged rotary mechanical switch having ganged synchronously operated contacts controlling the application of said voltage and said current function, means for applying a voltage proportional to the current flow through said first element to the vertical input of the oscilloscope, and additional rotary ganged mechanical contactor arranged to interrupt the circuit of said first element once during each rotary cycle of the ganged switches to establish a zero base line on the pattern of said scope, said means for providing said reference dot comprising a source of reference voltage having a potentiometer connected thereacross and contactors for disconnecting the said device from the oscilloscope once during each cycle of operation and connecting said reference voltage to the vertical input of the oscilloscope for establishing said dot.

References Cited in the file of this patent

UNITED STATES PATENTS

| | | |
|---|---|---|
| 2,612,626 | Miles | Sept. 30, 1952 |
| 2,833,986 | Golden | May 6, 1958 |
| 2,900,582 | Moll | Aug. 18, 1959 |
| 2,980,853 | Kline et al. | Apr. 18, 1961 |

OTHER REFERENCES

Waveforms, textbook by Chance et al., vol. 19, Radiation Laboratory Series, 1949, McGraw-Hill Book Co., Inc.

Chaplin: "Journal of Scientific Instruments," May 1952, pp. 142–145.

"Cathode Ray Tube Plots Transistor Curves," article in Electronics, February 1953, pp. 122–127.

Gutterman: "Electronics," July 1953, pp. 172–175.